United States Patent
Shimura

(10) Patent No.: US 7,540,557 B2
(45) Date of Patent: Jun. 2, 2009

(54) WINDSHIELD GLASS SUPPORT STRUCTURE

(75) Inventor: Gou Shimura, Toyota (JP)

(73) Assignee: Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 11/883,340

(22) PCT Filed: Jan. 13, 2006

(86) PCT No.: PCT/IB2006/000051

§ 371 (c)(1),
(2), (4) Date: Jul. 30, 2007

(87) PCT Pub. No.: WO2006/092675

PCT Pub. Date: Sep. 8, 2006

(65) Prior Publication Data

US 2008/0116721 A1    May 22, 2008

(30) Foreign Application Priority Data

Jan. 31, 2005    (JP)    ............................. 2005-024174

(51) Int. Cl.
    *B62D 25/08*    (2006.01)
(52) U.S. Cl. .................................................... 296/192
(58) Field of Classification Search .................. 296/192
    See application file for complete search history.

(56) References Cited

U.S. PATENT DOCUMENTS 4,943,102 A    7/1990    Hamamoto et al.

6,869,134 B2 *   3/2005   Kato et al. ................... 296/192
6,921,126 B2 *   7/2005   Suh et al. .................... 296/192

FOREIGN PATENT DOCUMENTS

| DE | 28 18 755 | 11/1979 |
|---|---|---|
| EP | 0 908 866 | 4/1999 |
| JP | 63-192608 | 8/1988 |
| JP | 64-19579 | 1/1989 |
| JP | 11-11351 | 1/1999 |
| JP | 2001-163249 | 6/2001 |
| JP | 2003-327165 | 11/2003 |
| JP | 2004-142621 | 5/2004 |
| JP | 2004-142647 | 5/2004 |
| KR | 1998-46552 A | 9/1998 |

OTHER PUBLICATIONS

Japanese Office Action dated Apr. 1, 2008.
International Search Report dated Nov. 16, 2006.
Written Opinion of the ISA, Apr. 1, 2008.
Korean Patent Office, Korean Office Action, Jan. 16, 2009, 4 pages.

* cited by examiner

*Primary Examiner*—Dennis H Pedder
(74) *Attorney, Agent, or Firm*—Finnegan, Henderson, Farabow, Garrett & Dunner, LLP

(57) ABSTRACT

In a windshield glass support structure, a lower end of a windshield glass is supported at an upper end of a cowl portion across the entire width in the vehicle width direction. The cowl portion is open toward the front of a vehicle body with a cowl outer which forms an upper portion of the cowl portion and a cowl inner which forms a lower portion of the cowl portion. Braces which form a closed cross-section with the cowl portion connect the cowl outer with the cowl inner at positions dividing the cowl portion into three substantially equal parts in the vehicle width direction.

6 Claims, 11 Drawing Sheets

WINDSHIELD GLASS SUPPORT STRUCTURE

BACKGROUND OF THE INVENTION

1. Field of the Invention

The invention relates to a windshield glass support structure which supports a windshield glass of an automobile with respect to a vehicle body.

2. Description of the Related Art

In recent years, a structure has been employed in which the rigidity of a cowl portion that supports a lower end of a windshield glass has been reduced in order to protect a pedestrian that has collided with an automobile. One problem with this structure, however, is that a muffled sound is produced from vibration of the windshield glass. A measure to reduce this muffled sound is disclosed in the second embodiment of Japanese Patent Application No. JP-A-2003-327165, for example. The technology described therein provides a stay member in a position in the antinode of secondary mode vibration in the cowl portion, which reinforces part of the cowl portion and suppresses secondary mode vibration of the windshield glass, and thus suppresses the production of muffled sound, while ensuring the ability to absorb impact.

Other related art is disclosed in Japanese Patent Application No. JP-A-11-11351.

From the standpoint of protecting pedestrians, however, there is a limit as to just how much the rigidity of the cowl portion can be increased by the stay member with the related art. Thus there remains room for further improvement in order to further reduce the vibration of the windshield glass and suppress the muffled sound.

SUMMARY OF THE INVENTION

In view of the foregoing facts, the invention thus aims to obtain a windshield glass support structure which is able to effectively reduce muffled sound.

A windshield glass support structure according to a first aspect of the invention includes a cowl portion which is open toward the front of a vehicle body and which supports, across the entire width in the vehicle width direction, a lower end of a windshield glass at an upper end, and a pair of reinforcing members which are arranged in positions dividing the cowl portion into three substantially equal parts in the vehicle width direction or along a lower end edge of the windshield glass, and which form a closed cross-section with the cowl portion.

With the windshield glass support structure according to the first aspect of the invention, displacement of the windshield glass at positions dividing the length of the windshield glass in the vehicle width direction or along the curved lower end edge into three substantially equal parts is suppressed by the pair of reinforcing members provided at the cowl portion. Accordingly, the amplitudes of primary mode vibration and secondary mode vibration of the windshield glass, which tend to cause changes in the volume of the air in some parts inside the vehicle cabin, are able to be suppressed, thus enabling the muffled sound to be effectively reduced. Also, the cowl portion and the windshield glass are reinforced only in some parts by the pair of reinforcing members, so the rigidity of the cowl portion is not increased more than is necessary.

A windshield glass support portion may also be positioned in the closed cross-section structure formed by the cowl portion and the reinforcing members.

In the first aspect of the invention, each of the reinforcing members may be fixed to an upper portion and a lower portion of the cowl portion.

In the first aspect of the invention, each of the reinforcing members may have a flange portion which is bent toward the rear of the vehicle body, and be fixed to the upper portion of the cowl portion at the flange portion.

According to the foregoing structure, a flange which faces toward the rear provided on the upper end of each of the reinforcing members is fixed to the upper portion of the cowl portion. As a result, a moment in the direction which cancels out vertical vibration of the cowl portion acts around the fixed portion. Accordingly, the vibration amplitude of the upper portion of the cowl portion, i.e., of the windshield glass, can be further reduced.

In the first aspect of the invention, each of the reinforcing members may be formed integrally with and extending from the cowl portion. Also, each of the reinforcing members may be formed integrally with and extending downward from the upper end of the cowl portion, and a free end of each of the reinforcing members fixed to the lower portion of the cowl portion.

According to the foregoing structure, by fixing the free end of each reinforcing member, which is formed extended from the upper end of the cowl portion, to the lower portion of the cowl portion by joining or the like, a muffled sound reduction effect of the reinforcing members is able to be achieved with a structure that is simple compared with a structure in which the reinforcing members are separate members.

In the first aspect of the invention, the cowl portion may have a rigidity which causes tertiary mode vibration to occur in the windshield glass in a frequency range in which primary resonance in the lateral direction of the vehicle body occurs in the air inside the vehicle cabin.

According to this structure, when primary resonance in the lateral direction of the vehicle body occurs in the air inside the vehicle cabin, the windshield glass vibrates in the tertiary mode. Thus, a change in the volume of the air in some parts inside the vehicle cabin is able to be suppressed. If the windshield glass vibrates in the secondary mode when primary resonance in the lateral direction of the vehicle body occurs in the air inside the vehicle cabin, for example, a reverse phase resonance mode in the lateral direction inside the vehicle is generated which tends to change the volume of the air in some parts inside the vehicle cabin. Also, if the windshield glass vibrates in the primary mode when primary resonance in the lateral direction of the vehicle body occurs in the air inside the vehicle cabin, for example, the change in the volume of the air in some parts inside the vehicle cabin increases because the vibration amplitude is large. By controlling the vibrational mode of the windshield glass to the tertiary mode, however, the fluctuation in the volume of the air in some parts inside the vehicle cabin, i.e., the muffled sound, can be suppressed.

Also, the pair of reinforcing members are arranged in positions which suppress primary and secondary vibration, but allow tertiary vibration of the windshield glass. Therefore, a suppression effect of a fluctuation in the volume of the air in some parts inside the vehicle cabin is able to be reliably obtained.

A windshield glass support structure according to a second aspect of the invention includes a support member which supports a lower end of a windshield glass such that tertiary mode vibration occurs in the windshield glass in a frequency range in which primary resonance in the lateral direction of a vehicle body occurs in air inside a vehicle cabin.

In the windshield glass support structure according to the second aspect of the invention, the windshield glass vibrates in the tertiary mode when the primary resonance in the lateral direction of the vehicle body occurs in the air inside the vehicle cabin. Thus, a change in the volume of air in some parts inside the vehicle cabin is able to be suppressed. If the windshield glass vibrates in the secondary mode when primary resonance in the lateral direction of the vehicle body occurs in the air inside the vehicle cabin, for example, it generates a reverse phase resonance mode at the left and right inside the vehicle, which tends to cause a change in the volume of air in some parts inside the vehicle cabin. Also, when the windshield glass vibrates in the primary mode when primary resonance in the lateral direction of the vehicle body occurs in the air inside the vehicle cabin, for example, the change in the volume of air in some parts inside the vehicle cabin increases because the vibration amplitude is large. By controlling the vibration mode of the windshield glass to the tertiary mode, however, the change in the volume of air in some parts inside the vehicle cabin, i.e., the muffled sound, can be suppressed.

This structure enables the muffled sound to be effectively reduced.

In the second aspect of the invention, the support member may include a cowl portion which is open toward the front of the vehicle body and which supports a lower portion of the windshield glass at an upper end, and a reinforcing member which is arranged in a position in a tertiary vibration node of the windshield glass, and which forms a closed cross-section with the cowl portion.

Furthermore, the reinforcing member may be fixed to an upper portion and a lower portion of the cowl portion.

According to this structure, the reinforcing members arranged in two locations, which are tertiary vibration nodes, allow or promote tertiary vibration while suppressing secondary vibration of the windshield glass. Also, the two reinforcing members suppress the amplitude of primary vibration, the antinode of which is the center portion in the vehicle width direction. Therefore, a suppression effect of a fluctuation in the volume of the air in some parts inside the vehicle cabin is able to be reliably obtained by controlling the vibrational mode of the windshield glass to the tertiary mode in a frequency range in which primary resonance in the lateral direction of the vehicle cabin occurs in the air inside the vehicle cabin.

A windshield glass support structure according to a third aspect of the invention includes a support member which supports a lower end of a windshield glass such that secondary mode vibration occurs in the windshield glass in a frequency range in which primary resonance in the longitudinal direction of a vehicle body occurs in the air inside a vehicle cabin.

In the windshield glass support structure according to the third aspect of the invention, the windshield glass vibrates in the secondary mode when primary resonance in the longitudinal direction of the vehicle body occurs in the air inside the vehicle cabin. Thus, a change in the volume of air in some parts inside the vehicle cabin is able to be suppressed. When the windshield glass vibrates in the primary mode when primary resonance in the longitudinal direction of the vehicle body occurs in the air inside the vehicle cabin, for example, the change in the volume of air in some parts inside the vehicle cabin tends to increase because the vibration amplitude is large. By controlling the vibration mode of the windshield glass to the secondary mode, however, the change in the volume of air in some parts inside the vehicle cabin, i.e., the muffled sound, can be suppressed.

This structure thus enables the muffled sound to be effectively reduced.

In the third aspect of the invention, the support member may include a cowl portion which is open toward the front of the vehicle body and which supports a lower portion of the windshield glass at an upper end, and a reinforcing member which is arranged in a position which is a secondary vibration node of the windshield glass, and which forms a closed cross-section with the cowl portion.

Moreover, in the above structure, the reinforcing member may be fixed to an upper portion and a lower portion of the cowl portion.

According to this structure, the reinforcing member arranged in one location, which is the tertiary vibration node, i.e., the center portion in the vehicle width direction, allows or promotes secondary vibration while suppressing primary vibration of the windshield glass. Therefore, a suppression effect of fluctuation in the volume of the air in some parts inside the vehicle cabin is able to be reliably obtained by controlling the vibrational mode of the windshield glass to the secondary mode in a frequency range in which primary resonance in the longitudinal direction of the vehicle cabin occurs in the air inside the vehicle cabin.

The windshield glass support structure according to the first, second, and third aspects of the invention is able to effectively reduce muffled sound.

BRIEF DESCRIPTION OF THE DRAWINGS

The foregoing and/or further objects, features, and advantages of the invention will become more apparent from the following description of preferred embodiments with reference to the accompanying drawings, in which the same or corresponding portions are denoted by the same reference numerals and wherein.

DETAILED DESCRIPTION OF THE EXEMPLARY EMBODIMENTS

Figure 1:
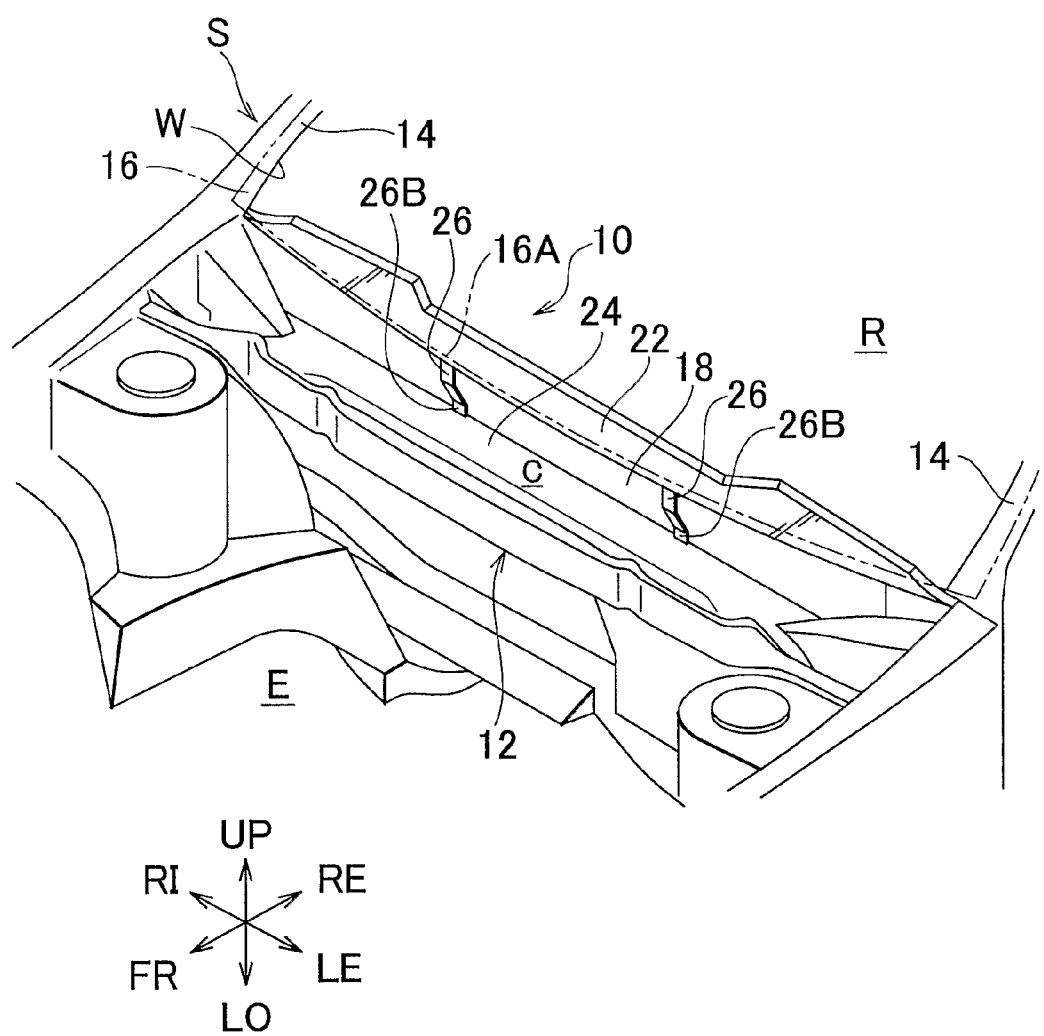
FIG. 1 is a perspective view of an automobile body to which a windshield glass support structure according to a first embodiment of the invention has been applied.

A windshield glass support structure 10 according to a first embodiment of the invention will now be described with reference to FIGS. 1 to 9. In each of the drawings, arrows FR, RE, UP, LO, RI, and LE indicate directions with respect to a body S of an automobile to which the windshield glass support structure 10 has been applied. That is, arrow FR points forward (i.e., in the direction of advance), arrow RE points to the rear, arrow UP points up, arrow LO points down, arrow RI points to the right, and arrow LE points to the left, all with respect to the body S of the automobile. When the directions up, down, front, rear, left, and right are referred to hereinafter, they are understood to correspond to the directions indicated by the corresponding arrows in the drawings.

FIG. 1 is a perspective view of a front portion of the vehicle body S to which the windshield glass support structure 10 has been applied. As shown in this drawing, a front window W is framed in by a cowl portion 12, a pair of left and right front pillars 14, and a roof header of a roof, not shown. The cowl portion 12 functions as a lower end support portion which is arranged at the border portion of a vehicle cabin R at a rear upper end of an engine room E. The front window W is closed by a windshield glass 16. A lower end 16A of the windshield glass 16 is fixed by adhesive to the cowl portion 12 and an upper end of the windshield glass 16 is fixed by adhesive to the roof header. Also, left and right ends of the windshield glass 16 are supported by or fixed to corresponding front pillars 14.

Figure 2:
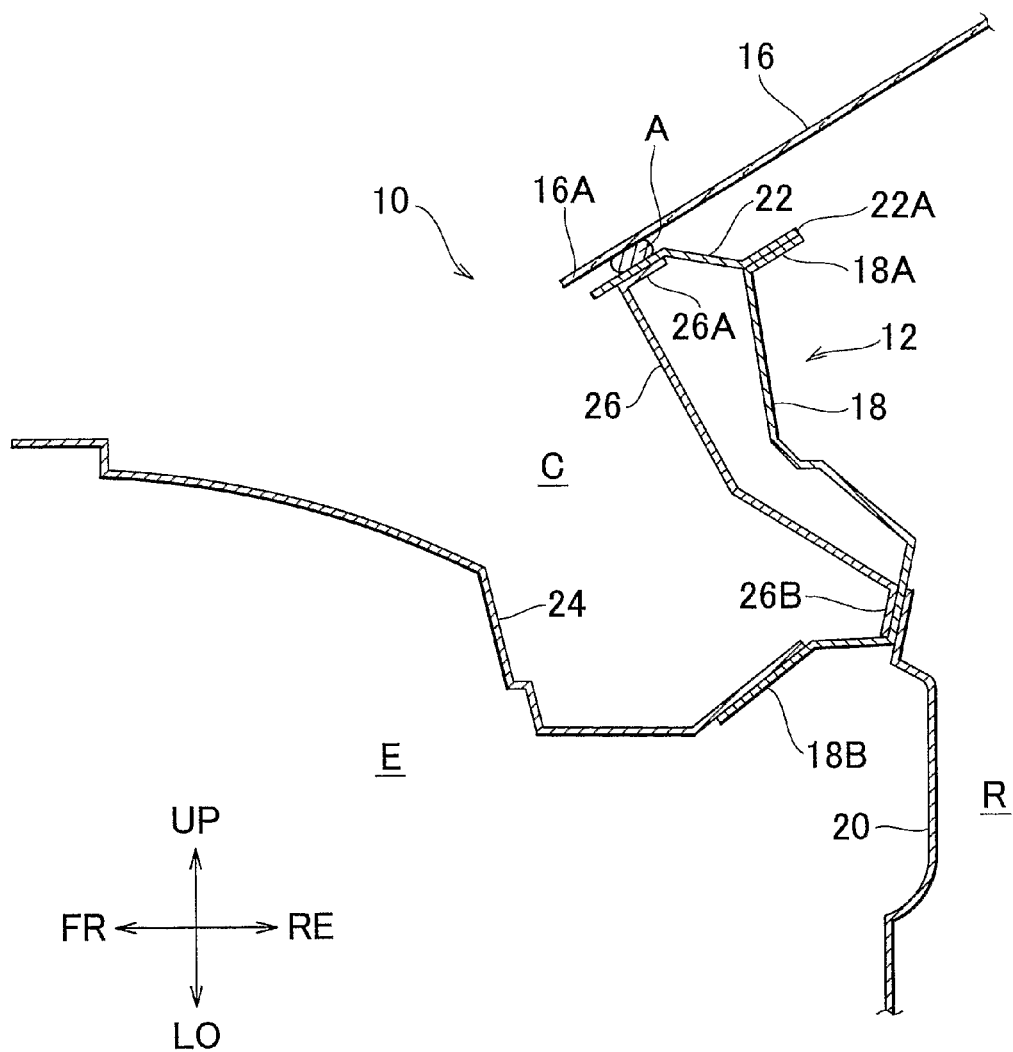
FIG. 2 is a sectional side view of the windshield glass support structure according to the first embodiment of the invention.

As shown in FIG. 1, the cowl portion 12 includes a long cowl inner 18 which extends in the vehicle width direction. As shown in FIG. 2, a lower end of the cowl inner 18 is fixed to an upper end of a dash panel 20. Also, a cowl outer 22 is fixed to an upper end of the cowl inner 18. The lower end 16A of the windshield glass 16 is fixed with an adhesive A to a front end of the cowl outer 22. The cowl outer 22 is fixed onto the cowl inner 18 as described above by fixing a cowl outer rear flange 22A to a cowl inner upper flange 18A of the cowl inner 18 by spot welding.

The lower end portion of the cowl inner 18 is a cowl inner lower flange 18B which extends forward and opposes the front portion of the cowl outer 22. Accordingly, the cowl portion 12 is formed in a general U-shape which is open to the front when viewed from a sectional side view. Further, a cowl front 24 which extends forward is fixed to the cowl inner lower flange 18B, and forms a cowl box (i.e., air box) C which is open upward. The cowl box C is closed by being covered from above by a rear end portion of an engine hood and cowl louver, not shown.

Referring back to FIG. 1, braces 26 which serve as reinforcing members are provided in two different locations in the vehicle width direction of the cowl portion 12. As shown in FIG. 2, each brace 26 spans between an area near the lower end of the cowl inner 18 and the front end of the cowl outer 22 (i.e., the portion fixed to the windshield glass 16 by the adhesive A). More specifically, the upper end of each brace 26 is formed bent into a brace upper flange 26A which is joined by welding to the lower surface of the front end portion of the cowl outer 22, while the lower end of each brace 26 is formed bent into a brace lower flange 26B which is joined by welding to the front surface of the lower end portion of the cowl inner 18, i.e., to the base portion of the cowl inner lower flange 18B. In this embodiment, the brace upper flange 26A is bent toward the rear and fixed to the lower surface of the front end portion of the cowl outer 22 by spot welding.

Figure 3:
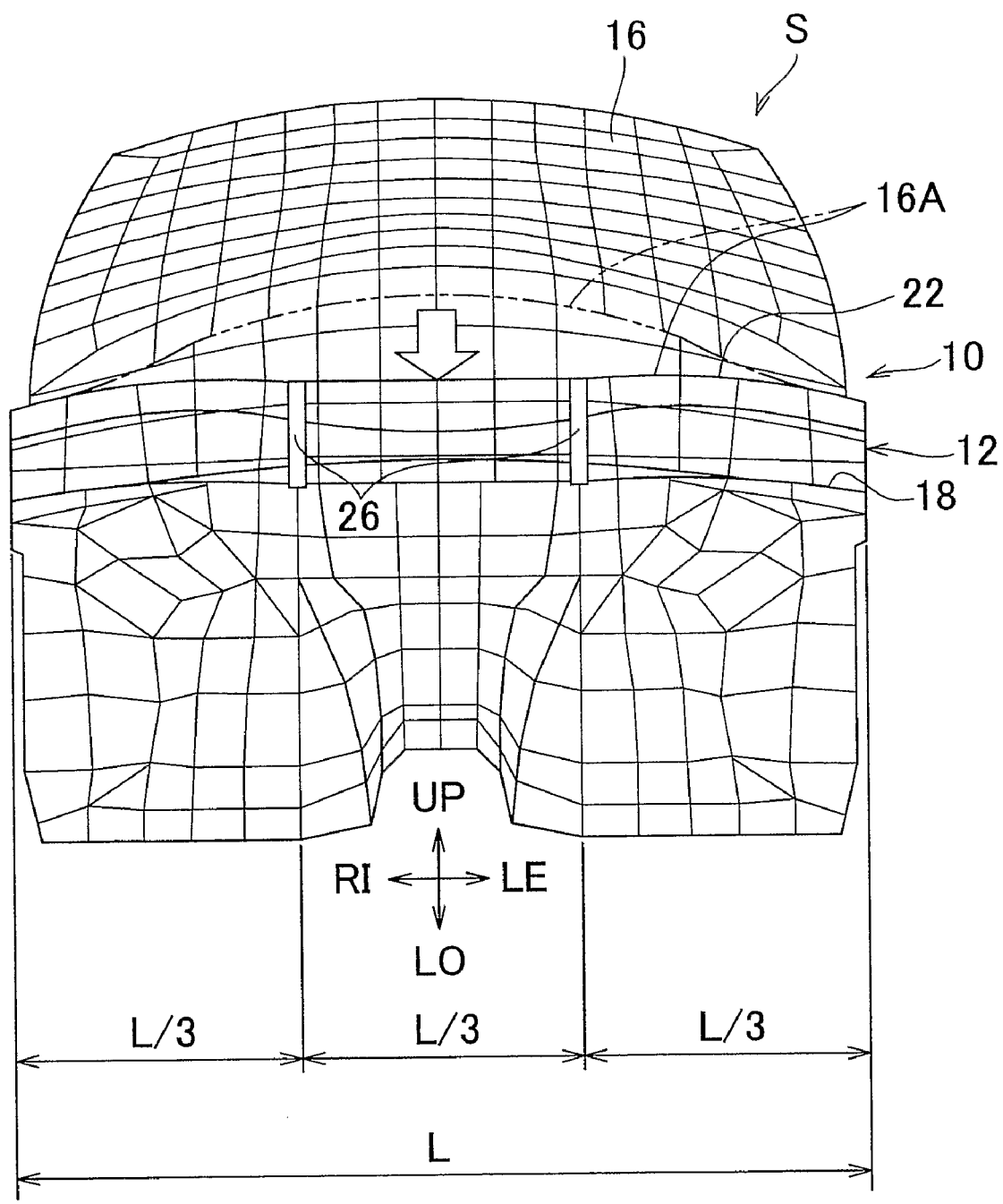
FIG. 3 is a view illustrating vibrational displacement in a low frequency range of a windshield glass supported by the windshield glass support structure according to the first embodiment of the invention.
Figure 6:
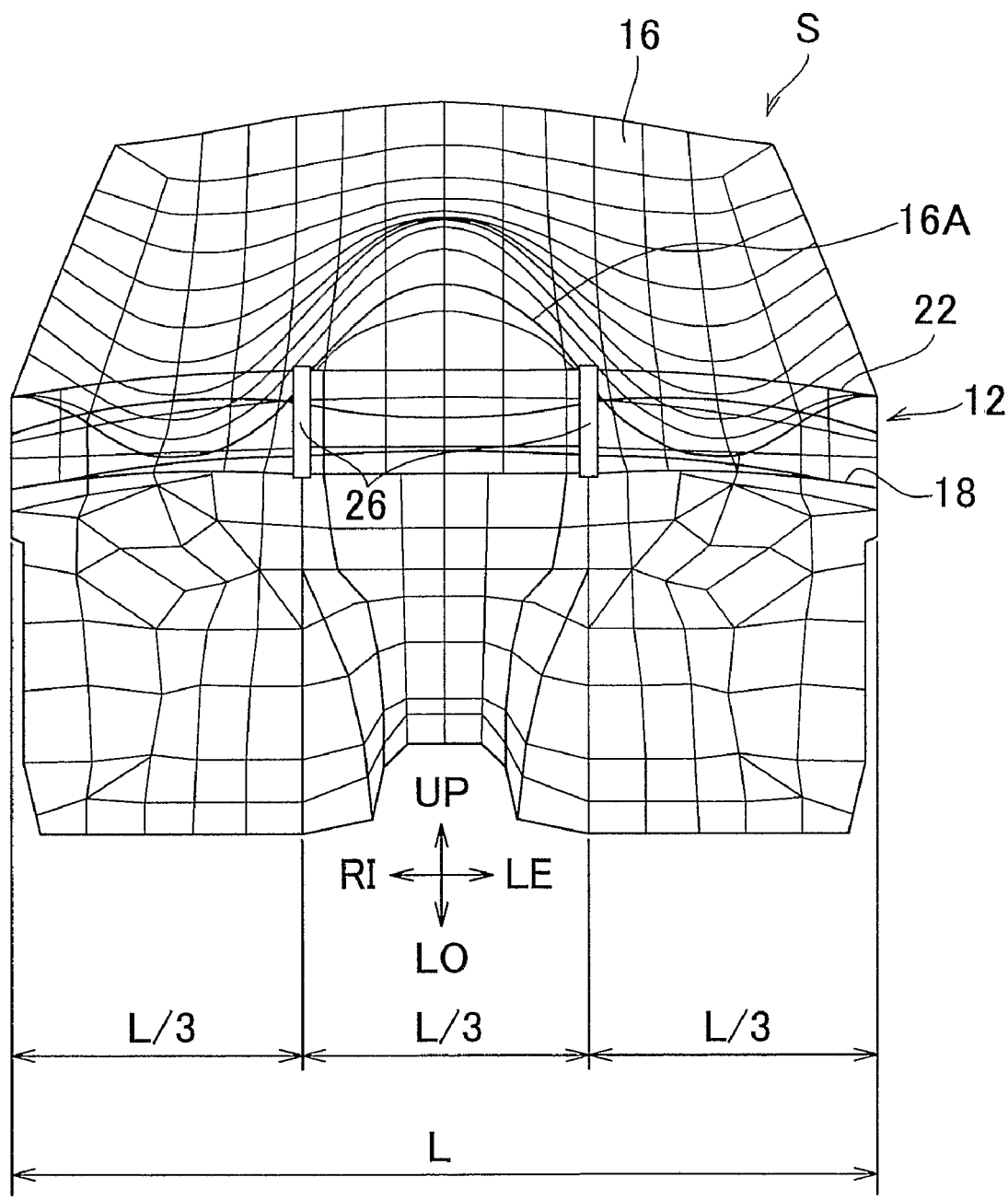
FIG. 6 is a view showing the vibrational displacement in the mid frequency range of the windshield glass supported by the windshield glass support structure according to the first embodiment of the invention.

Moreover, the braces 26 are arranged in positions which divide the length L of the cowl portion 12 in the vehicle width direction into three equal parts, as shown in FIGS. 3 and 6. These positions substantially match the positions of the tertiary mode vibration node of the lower end 16A of the windshield glass 16 or the cowl portion 12, as shown in FIG. 6, as well as substantially match the position of the secondary mode vibration node of the lower end 16A of the windshield glass 16, not shown.

As a result, the cowl portion 12 forms a closed cross-section at the portions where the braces 26 are arranged, i.e., at the location of the secondary mode vibration antinode. The closed cross-section portion formed by the braces 26 and the cowl portion 12 acts as a reinforcing and rigid member against minute inputs such as vibration of the windshield glass 16, but has little reinforcing effect against large inputs such as those which occur when an impacting body such as a head of a person, for example, impacts the cowl portion 12 from above. Therefore, the cowl portion 12 is structured so that it will deform and readily absorb an impact when the cowl outer 22 and the lower end 16A of the windshield glass 16 are impacted from above. According to this embodiment, upon impact, the portion of the cowl outer 22 that is to the front of the portion which is fixed to the cowl inner 18 will deform by turning downward.

With the windshield glass support structure 10, the rigidity of the cowl portion 12 which is reinforced by the braces 26 is set such that the lower end 16A of the windshield glass 16 will vibrate in the tertiary mode in a frequency range (such as approximately 80 Hz to 110 Hz) in which primary resonance in the lateral direction of the vehicle body occurs in the air inside the vehicle cabin. According to this embodiment, the rigidity of the cowl portion 12 is set so that the tertiary mode resonant frequency of the windshield glass 16 becomes approximately 100 Hz.

Furthermore, the windshield glass support structure 10 is such that the braces 26 are arranged in positions dividing the cowl portion 12 into three equal parts in the vehicle width direction, as described above, which makes tertiary mode vibration more apt to occur in the windshield glass 16. The two braces 26 are arranged in positions which substantially match the locations of the tertiary mode vibration node of the windshield glass 16, and the rigidity of the cowl portion 12 is relatively low at the location of the tertiary mode vibration antinode of the windshield glass 16. As a result, tertiary mode vibration tends to occur in the windshield glass 16. Accordingly, the cowl portion 12 is of a structure which produces tertiary mode vibration in a wide frequency range that includes the tertiary mode resonant frequency described above.

Next, operation of the first embodiment will be described.

In the windshield glass support structure 10 of the structure described above, membrane vibration occurs in the windshield glass 16 with the upper end being the fixed end when engine vibration is transmitted to the windshield glass 16 through the vehicle body S, i.e., through the cowl portion 12. When the frequency of the vibration input to the windshield glass 16 is low (such as approximately 30 Hz to 40 Hz), primary resonance in the longitudinal direction of the vehicle body occurs in the air inside the vehicle cabin. The windshield glass 16 then vibrates in the primary mode which tends to produce a low frequency range muffled sound.

In this case, with the windshield glass support structure 10 of this embodiment, the pair of braces 26, which are arranged in positions that divide the cowl portion 12 into three equal parts in the vehicle width direction, suppress primary mode vibration of the windshield glass 16, as shown in the model in FIG. 3. That is, the braces 26 which are arranged on both sides of the primary mode vibration antinode of the windshield glass 16 so as to sandwich that region limit displacement of the windshield glass 16. In FIG. 3, the lower end 16A in a case in which the braces 26 according to this embodiment are provided is shown by the solid line, and for comparison, the lower end 16A of the windshield glass 16 in a case in which the braces 26 are not provided is shown by the chain double-dashed line. From the drawing, it is evident that displacement of the lower end 16A in this embodiment is suppressed significantly compared with the displacement of the lower end 16A in the comparative example. As described above, with the vehicle body S to which the windshield glass support structure 10 has been applied, a change in the volume of the air in some parts inside the vehicle cabin is suppressed, which in turn reduces the low frequency range muffled sound.

Figure 4:
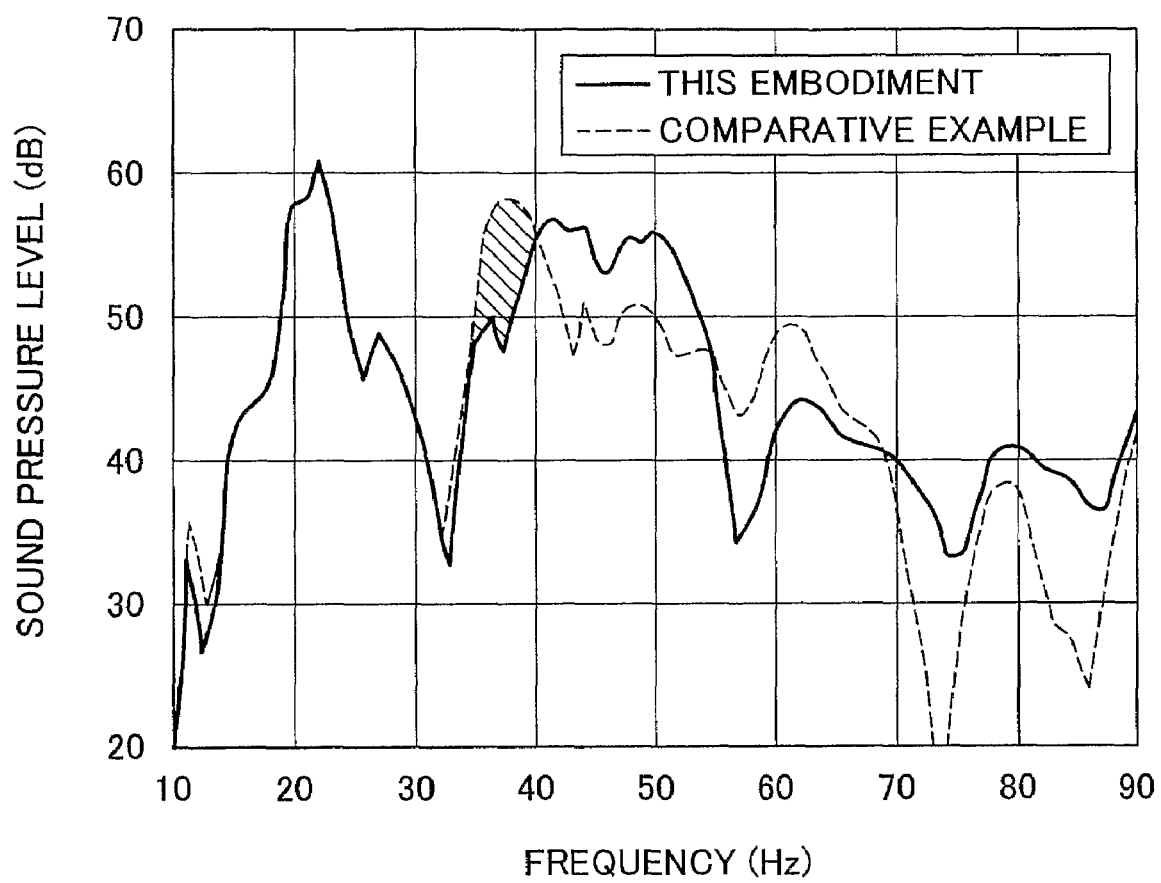
FIG. 4 is a chart showing the frequency distribution of vehicle cabin noise in the automobile to which the windshield glass support structure according to the first embodiment of the invention has been applied.

Also, in FIG. 4, the solid line indicates the measurement results of the sound pressure level inside the vehicle cabin R of the vehicle having the windshield glass support structure 10 of this embodiment, and the broken line indicates the measurement results of the sound pressure level inside the vehicle cabin R of the comparative example. From the drawing, it is evident that with this embodiment the low frequency range muffled sound component (the portion indicated by hatching in the drawing) from 33 Hz to 40 Hz of the vehicle cabin noise is reduced compared with the comparative example.

Also, when the frequency of the vibration input to the windshield glass 16 is in the mid frequency range (such as approximately 80 Hz to 110 Hz), primary resonance in the lateral direction of the vehicle occurs in the air inside the vehicle cabin. When the windshield glass 16 vibrates in the secondary mode at this time, a mid frequency range muffled sound tends to be produced.

Figure 5A:
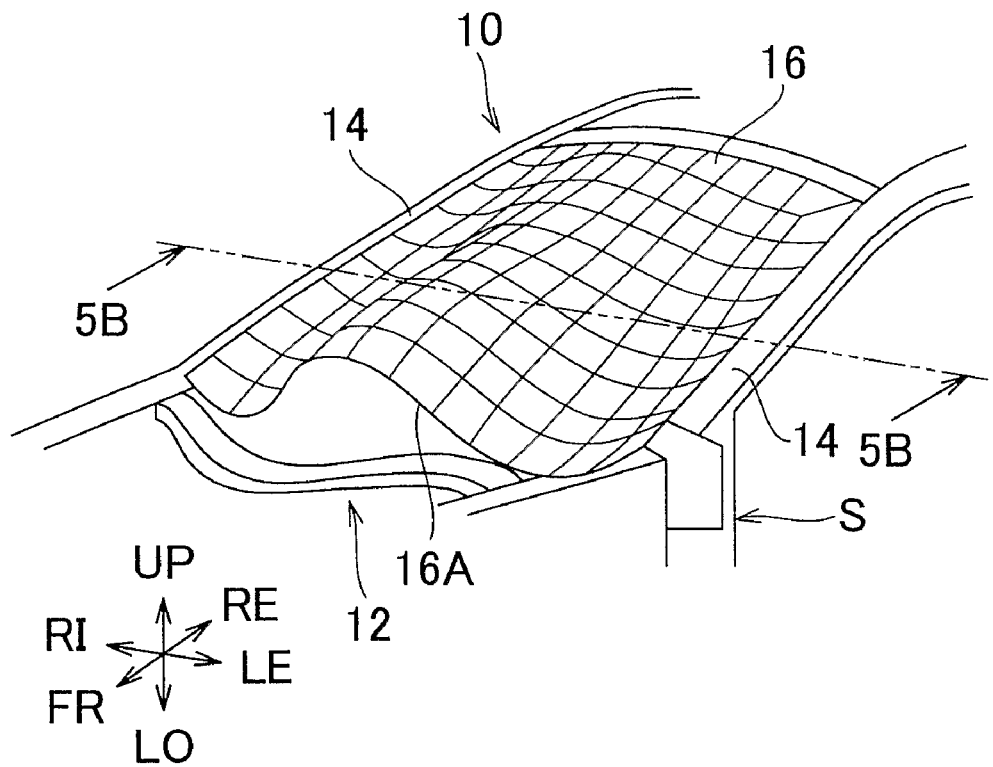
FIG. 5A is a representative perspective view showing an exaggeration of vibrational displacement in a mid frequency range of the windshield glass supported by the windshield glass support structure according to the first embodiment of the invention.
Figure 5B:
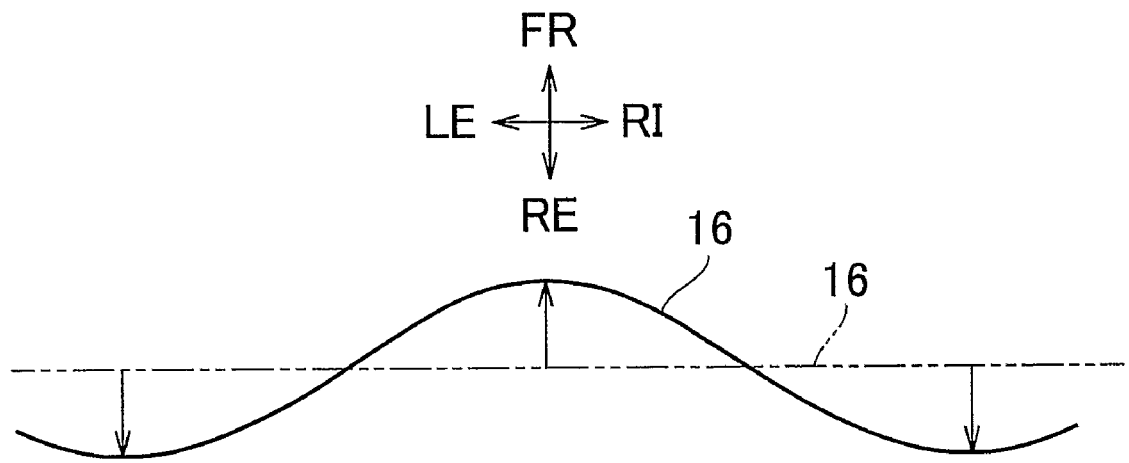
FIG. 5B is a sectional view taken along line 5B-5B in FIG. 5A, showing an exaggeration of the vibrational displacement in the mid frequency range of the windshield glass supported by the windshield glass support structure according to the first embodiment of the invention.

In this case, with the windshield glass support structure 10 of this embodiment, the pair of braces 26 are arranged in positions dividing the cowl portion 12 into three equal parts in the vehicle width direction. As a result, tertiary mode vibration shown exaggerated in FIG. 5A is produced, with almost no secondary mode vibration being produced, in a wide frequency range in the windshield glass 16. Tertiary mode resonant frequency of the windshield glass 16 is set to be within the frequency range in which primary resonance in the lateral direction of the vehicle body occurs in the air inside the vehicle cabin. Therefore, when primary resonance in the lateral direction of the vehicle body occurs in the air inside the vehicle cabin, the windshield glass 16 vibrates in the tertiary mode.

Therefore, a change in the volume of the air in some parts inside the vehicle cabin following vibration of the windshield glass 16 is suppressed. More specifically, as shown in frame format in FIGS. 5B and 6, in the windshield glass 16 which vibrates in the tertiary mode, the center portion in the vehicle width direction and the outside portion of that center portion are displaced at reverse phases with respect to the neutral position (i.e., the position when not vibrating) shown by the chain double-dashed line in FIG. 5B, so a change in the volume of the air in some parts inside the vehicle cabin is suppressed. Also, the vibration amplitude is smaller in the tertiary mode than it is in the secondary mode, which also suppresses or cancels a change in the volume of the air in some parts inside the vehicle cabin.

Moreover, the mid frequency range is near the frequency range (such as approximately 90 Hz to 120 Hz) in which secondary resonance in the longitudinal direction of the vehicle body occurs in the air inside the vehicle cabin. Therefore, there are also cases in which a so-called reverse phase mode occurs, in which the air in the vehicle cabin has reversed phases at the left and right of the vehicle body and resonates in the longitudinal direction of the vehicle body. However, because the windshield glass 16 vibrates in the tertiary mode, a change in the volume of the air in some parts inside the vehicle cabin is able to be suppressed or cancelled even if the air inside the vehicle cabin resonates in the reverse phase mode. That is, with the windshield glass support structure 10, secondary mode vibration of the windshield glass 16 does not occur. As a result, mid frequency range muffled sound which is produced when the air inside the vehicle cabin resonates in the reverse phase mode, i.e., when secondary resonance in the longitudinal direction of the vehicle body occurs in the air inside the vehicle cabin, is prevented without secondary mode vibration of the windshield glass 16 occurring in accordance with the secondary resonance in the longitudinal direction of the vehicle body of the air inside the vehicle cabin.

Figure 7:
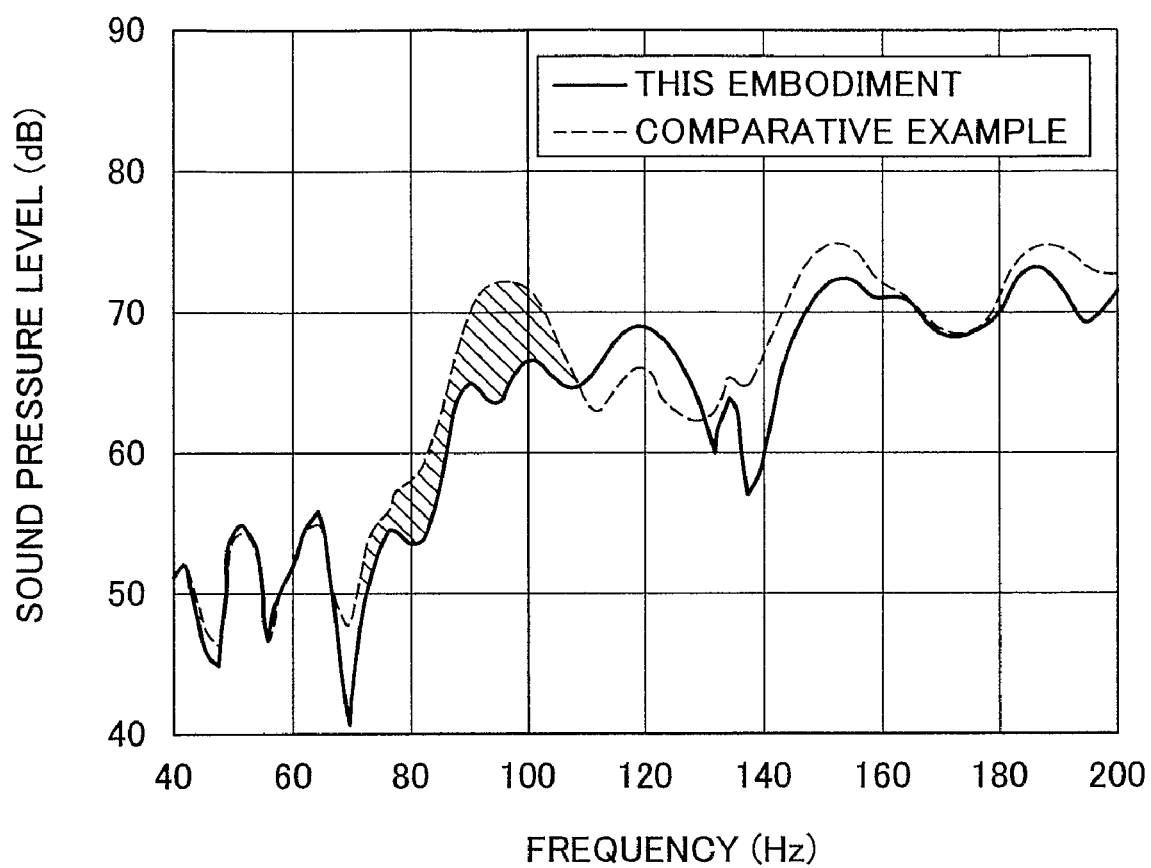
FIG. 7 is a chart showing the frequency distribution of vehicle cabin noise in the automobile to which the windshield glass support structure according to the first embodiment of the invention has been applied.

Accordingly, with the windshield glass support structure 10, a change in the volume of the air in some parts inside the vehicle cabin in the mid frequency range is suppressed, and as a result, mid frequency range muffled sound is reduced. In FIG. 7, the solid line indicates the measurement results of the sound pressure level in the vehicle cabin R of the vehicle having the windshield glass support structure 10 provided with the braces 26 according to this embodiment is provided, and for comparison, the broken line indicates the measurement results of the sound pressure level in the vehicle cabin R of the vehicle not having the braces 26. From the drawing, it is evident that with this embodiment the mid frequency range muffled sound component (the portion indicated by hatching in the drawing) from 75 Hz to 110 Hz of the vehicle cabin noise is reduced compared with the comparative example.

Figure 8A:
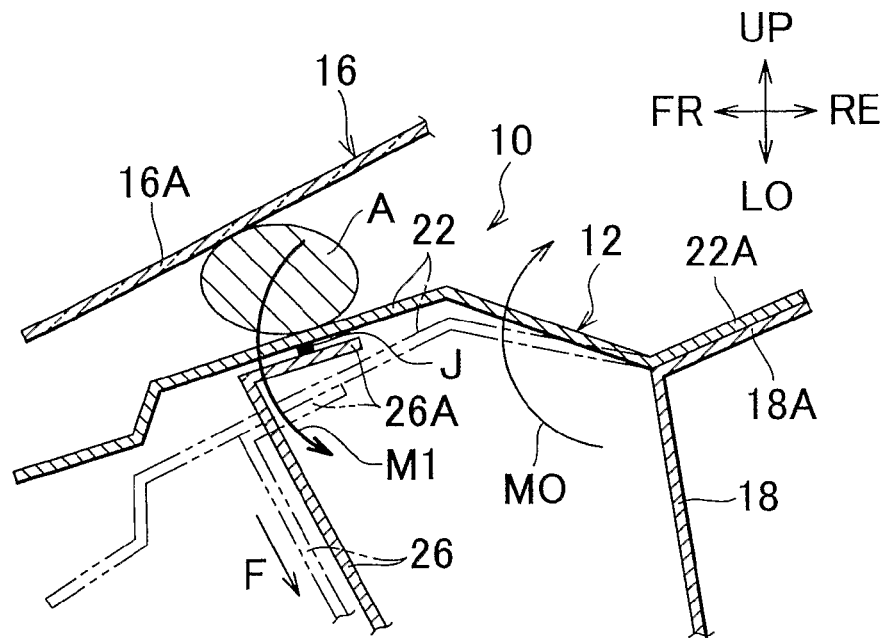
FIG. 8A is a pattern diagram illustrating a brace which forms the windshield glass support structure according to the first embodiment of the invention.

Moreover, with the windshield glass support structure 10, the brace 26 is fixed to the cowl outer 22 at the brace upper flange 26A which is bent toward the rear, which enables the vibration level of the windshield glass 16 to be reduced. More specifically, as shown in FIG. 8A, vibrational displacement of the lower end 16A of the windshield glass 16 occurs mainly due to angular displacement around the rear end of the cowl outer 22, i.e., around the front end of the cowl outer rear flange 22A. For example, when the cowl outer 22 and the like is displaced upward from the state indicated by the chain double-dashed line due to a moment M0 around the rear end of the cowl outer 22, a moment M1 acts around a spot weld joint J by tension F acting on the brace 26. This moment M1 is a moment in the opposite direction of the moment M0 and acts on the cowl outer 22 in a direction which cancels out the moment M0, in addition to a moment, not shown, generated directly around the rear end of the cowl outer 22 by the tension F. As a result, the displacement, i.e., vibration amplitude, of the windshield glass 16 is reduced.

Figure 8B:
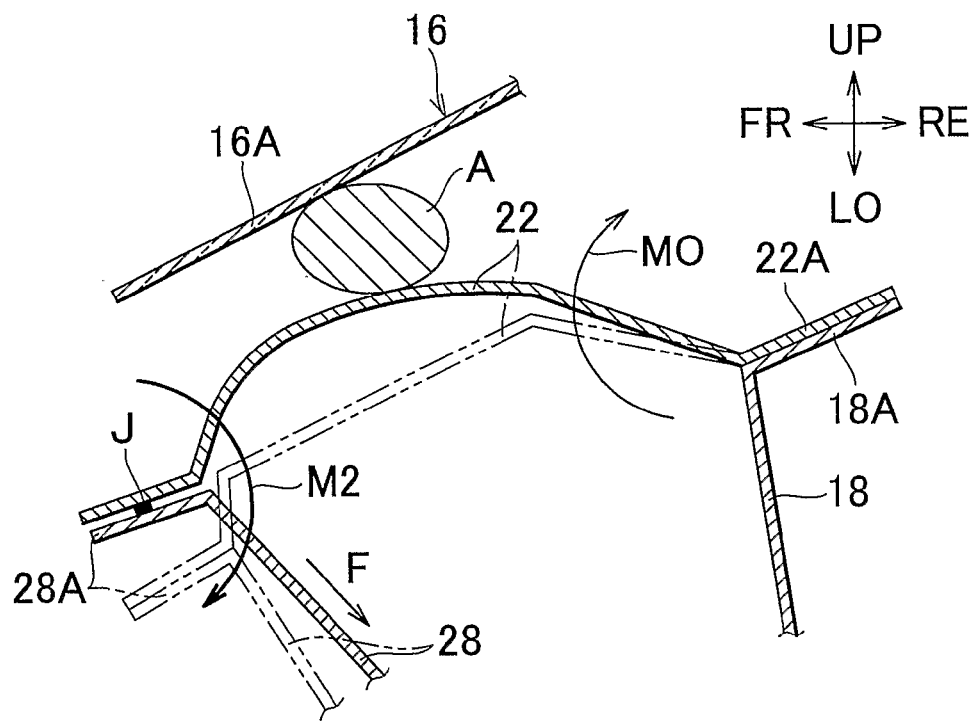
FIG. 8B is a pattern diagram illustrating a brace according to a comparative example.

In the structure shown in FIG. 8B (this structure is also included in the invention), a brace 28 having a brace upper flange 28A formed bent toward the front is provided instead of the brace 26. As a result, when tension F is generated in the brace 28 by the moment M0 of the cowl outer 22, a moment M2 is generated in the same direction as the moment M0 around the weld joint J. Therefore, no moment, other than the moment generated directly around the rear end of the cowl outer 22 by the tension F, is generated on the cowl outer 22 which cancels out the moment M0.

Figure 9:
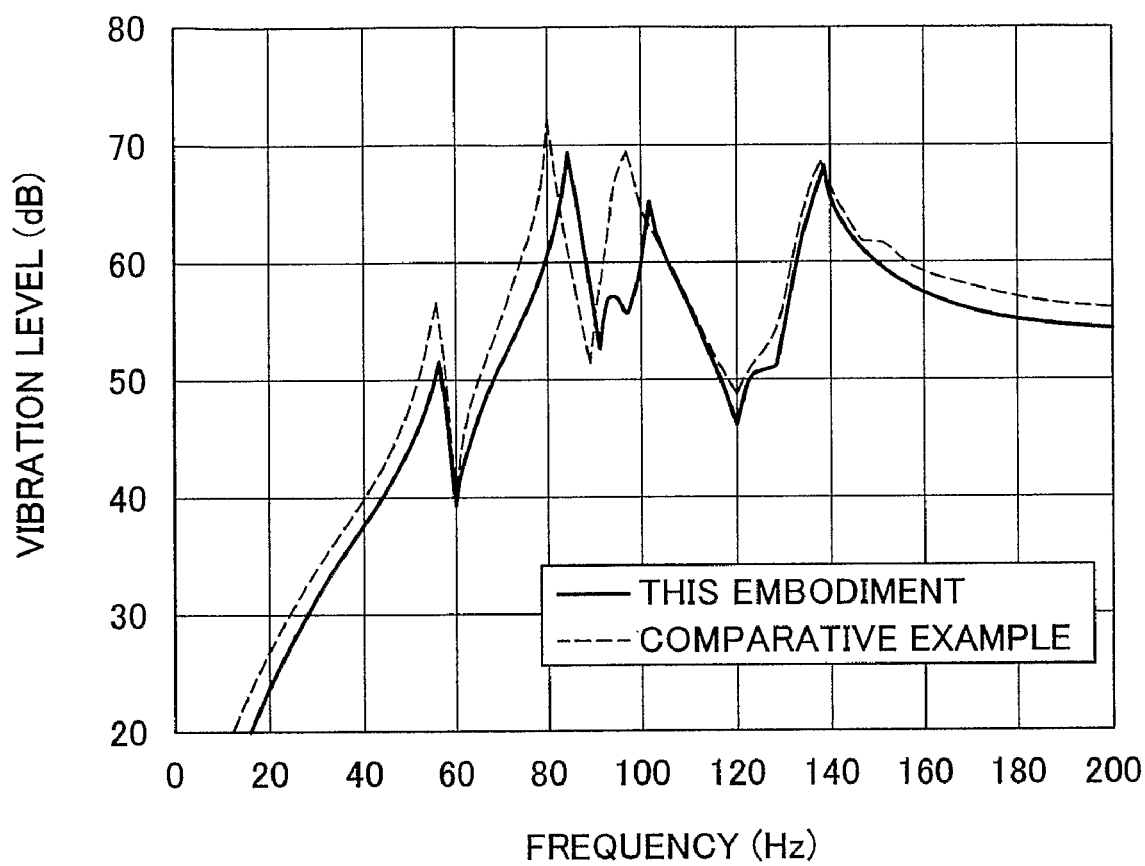
FIG. 9 is a chart showing the vibration level of the windshield glass supported by the windshield glass support structure according to the first embodiment of the invention.

In FIG. 9, the solid line indicates the measurement results of the vibration level in the vehicle cabin R of the vehicle having the windshield glass support structure 10 according to this embodiment, and the broken line indicates the measurement results of the vibration level of the lower end 16A of the windshield glass 16 in the comparative example shown in FIG. 8B. From the drawing, it is evident that with this windshield glass support structure 10 the vibration level of the windshield glass 16 over a wide range of up to and including 100 Hz is reduced compared with the comparative example. Accordingly, with the windshield glass support structure 10, the muffled sound is even further reduced. More particularly, when the windshield glass 16 vibrates in the primary mode the low frequency range muffled sound, which is greatly affected by the vibration amplitude, is even more effectively reduced.

With the windshield glass support structure 10, the cowl portion 12 is open toward the front except for the portions where the braces 26 are arranged, so the rigidity in the vertical direction is low. As a result, impact energy generated when an impacting object impacts the lower end of the windshield glass 16 from above is able to be effectively absorbed by deformation of the cowl portion 12.

In this way, with the windshield glass support structure 10 according to the first embodiment, muffled sound can effectively be reduced while maintaining the required pedestrian protection performance.

Next, another embodiment of the invention will be described. Components and portions in this embodiment that are similar to those in the first embodiment or the foregoing structure will be denoted by the same reference numerals and descriptions and drawings thereof may be omitted.

A second embodiment will now be described.

Figure 10:
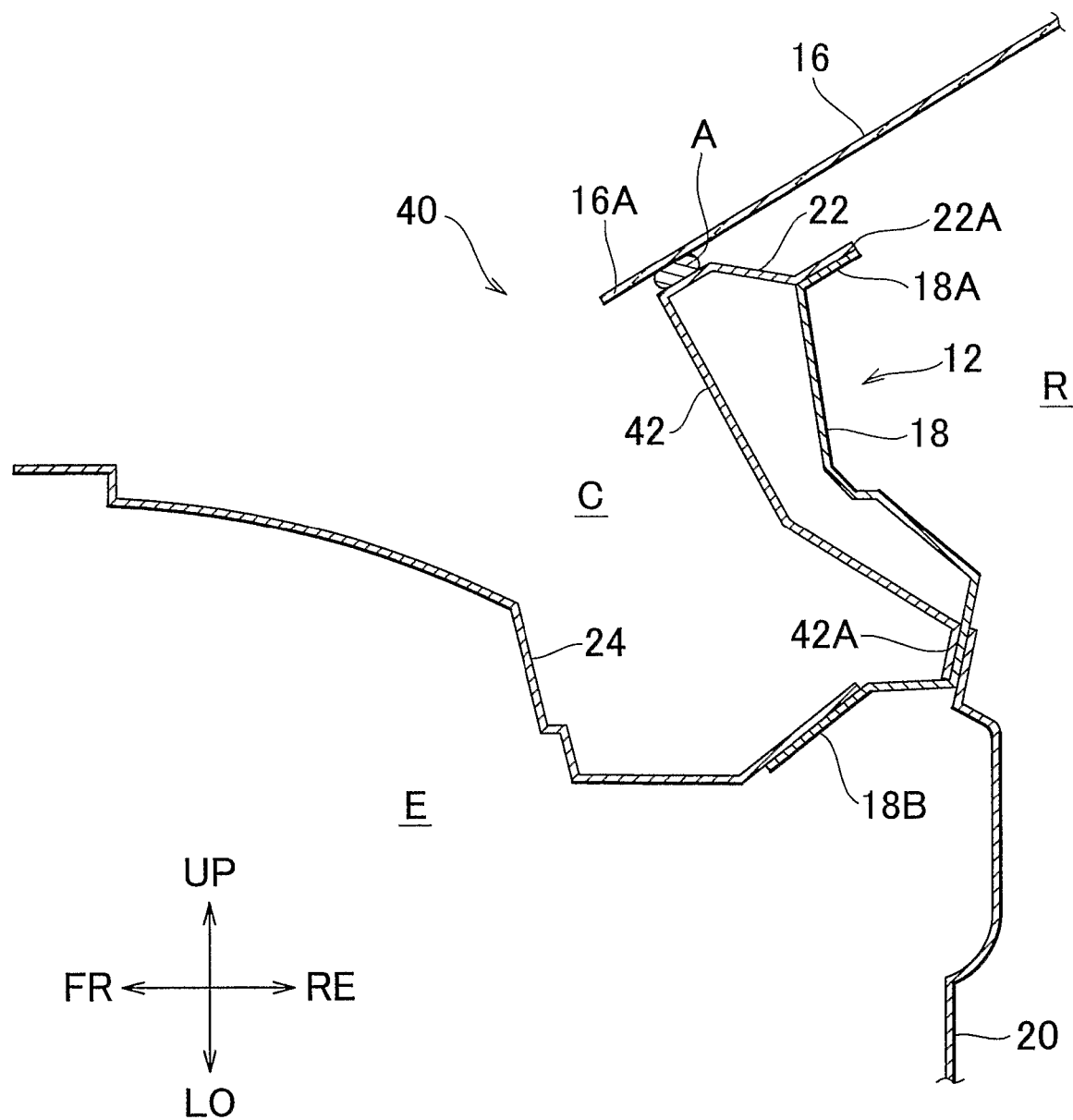
FIG. 10 is a sectional side view of a windshield glass support structure according to a second embodiment of the invention.

FIG. 10 is a sectional side view of a windshield glass support structure 40 according to the second embodiment. As shown in the drawing, the windshield glass support structure 40 is provided with a brace 42 which extends downward from the front end of the cowl outer 22, instead of the brace 26. That is, the brace 42 is integrally formed with the cowl outer 22 by punching or press forming so that the upper end of the brace 42 continues on to the front end of the cowl outer 22. A brace lower flange 42A, which is similar to the brace lower flange 26B, is formed bent. The brace lower flange 42A is fixed to the front surface of the lower end portion of the cowl inner 18.

The arrangement of the braces 42 in the vehicle width direction is the same as that of the braces 26. Also, the other structure of the windshield glass support structure 40 is similar to that of the windshield glass support structure 10.

Therefore, effects similar to those obtained by the windshield glass support structure 10 according to the first embodiment can also be obtained with the windshield glass support structure 40 according to the second embodiment. That is, the windshield glass support structure 40 according to the second embodiment enables muffled sound to be effectively reduced while maintaining the required pedestrian protection performance. Also, the number of both parts and weld joints are reduced with the windshield glass support structure 40 compared to a structure in which the braces 26 are provided separately from the cowl outer 22 shown in the first embodiment. With the windshield glass support structure 40 of this embodiment, there is no weld joint J like there is in the first embodiment so the moment M1 around the weld joint which cancels out the moment M0 is not generated. In addition, the moment M2 is not generated either.

The first and second embodiments illustrate examples in which a pair of braces 26 or 42 are arranged in positions dividing the cowl portion 12 into three equal parts in the vehicle width direction. The invention is not limited to this, however. For example, the invention may also be structured such that the braces 26 or 42 are arranged in positions which divide the lower end 16A of the curved windshield glass 16 into three equal parts. That is, in this embodiment in which the tertiary mode resonant frequency is set to the frequency range of the primary resonance in the lateral direction of the vehicle body of the air inside the vehicle cabin, the braces 26 or 42 may be arranged at the location of the tertiary mode vibration node of the cowl portion 12 or the lower end 16A, i.e., arranged near the location of the secondary mode vibration antinode in a position which produces tertiary mode vibration while inhibiting secondary mode vibration, i.e., arranged in a position that enables the vibration mode to be controlled to the tertiary mode.

A third embodiment will now be described.

Figure 11:
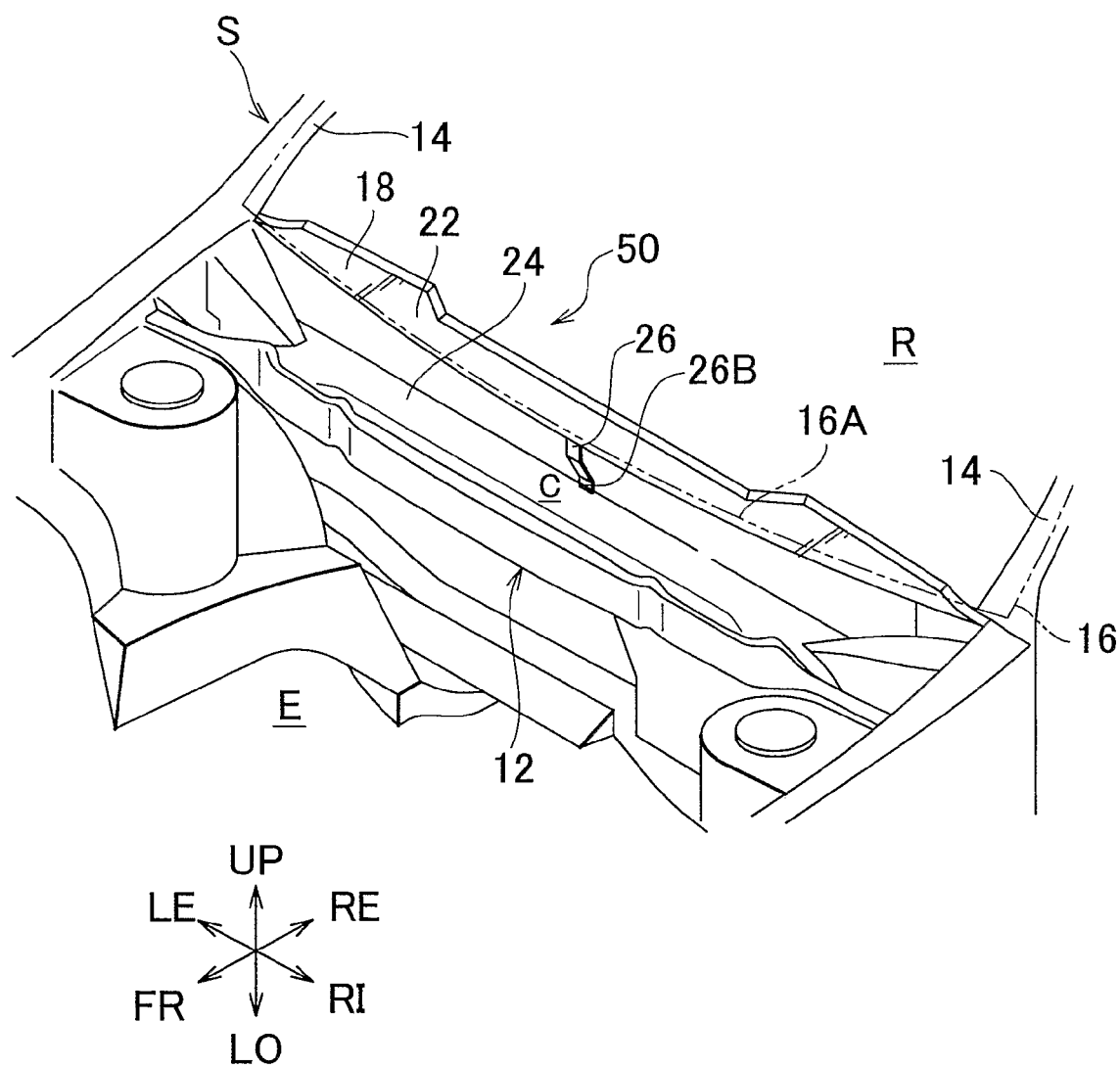
FIG. 11 is a perspective view of an automobile body to which a windshield glass support structure according to a third embodiment of the invention has been applied.

FIG. 11 is a perspective view of a windshield glass support structure 50 according to the third embodiment. As shown in the drawing, only one brace 26 is provided in the windshield glass support structure 50. This brace 26 is arranged in the center, in the vehicle width direction, of the cowl portion 12, i.e., in the secondary mode vibration node of the lower end 16A of the windshield glass 16, i.e., in the location of the primary mode vibration antinode.

In the windshield glass support structure 50, the rigidity of the cowl portion 12 which is reinforced by the brace 26 is set such that the lower end 16A of the windshield glass 16 vibrates in the secondary mode in a frequency range (such as approximately 30 Hz to 40 Hz) in which primary resonance in the longitudinal direction of the vehicle body occurs in the air inside the vehicle cabin. In this embodiment, the rigidity of the cowl portion 12 is set such that the tertiary mode resonant frequency of the windshield glass 16 is approximately 35 Hz.

Further, in the windshield glass support structure 50 of this embodiment, arranging the brace 26 in the center portion in the vehicle width direction tends to result in secondary mode vibration occurring in the windshield glass 16, as described above. That is, the brace 26 is arranged substantially aligned with the location of the secondary mode vibration node of the windshield glass 16. Because the rigidity of the cowl portion 12 is relatively low at the secondary mode vibration antinode of the windshield glass 16, secondary mode vibration tends to occur in the windshield glass 16.

Next, operation of the third embodiment will be described.

In the windshield glass support structure 50 of the structure described above, the windshield glass 16 vibrates when engine vibration is transmitted to the windshield glass 16 through the vehicle body S, i.e., through the cowl portion 12. When the frequency of the vibration input to the windshield glass 16 is low (such as approximately 30 Hz to 40 Hz), primary resonance in the longitudinal direction of the vehicle body occurs in the air inside the vehicle cabin. When primary mode vibration occurs in the windshield glass 16 at this time, the change in the volume of the air in some parts inside the vehicle cabin increases, which tends to result in a low frequency range muffled sound.

In this case, with the windshield glass support structure 50 of this embodiment, the brace 26 is arranged in the center portion, in the vehicle width direction, of the cowl portion 12 so almost no primary mode vibration occurs in the windshield glass 16. Because the secondary mode resonant frequency of the windshield glass 16 is set to be within the frequency range in which primary resonance in the longitudinal direction of the vehicle body occurs in the air inside the vehicle cabin, secondary mode vibration occurs in the windshield glass 16 when primary resonance in the longitudinal direction of the vehicle body occurs in the air inside the vehicle cabin.

Therefore, a change in the volume of the air in some parts inside the vehicle cabin following vibration of the windshield glass 16 is suppressed. Accordingly, with the windshield glass support structure 50, a change in the volume of the air in some parts inside the vehicle cabin in the mid frequency range is suppressed, and as a result, mid frequency range muffled sound is reduced. Also in the windshield glass support structure 50, the brace 26 is fixed to the cowl outer 22 at the brace upper flange 26A which is bent toward the rear. As a result, the vibrational amplitude of the windshield glass 16 is able to be reduced just as in the first embodiment. Moreover, with the windshield glass support structure 50, impact energy generated when an impacting object impacts the lower end of the windshield glass 16 from above is able to be effectively absorbed by deformation of the cowl portion 12, just as in the first embodiment.

In this way, the windshield glass support structure 50 according to the third embodiment enables muffled sound to be effectively reduced while maintaining the required pedestrian protection performance.

The invention claimed is:

1. A windshield glass support structure comprising:
   a cowl portion which does not have a structure having a closed cross-section and extending in a vehicle width direction, and which is open toward the front of a vehicle body such that an upper end of the open cowl portion supports, across the entire width in the vehicle width direction, a lower end of a windshield glass; and
   a pair of reinforcing members each of which is formed in a plate shape whose width direction is directed in the vehicle width direction, which are arranged in positions dividing the cowl portion into three substantially equal parts in the vehicle width direction or along a lower end edge of the windshield glass, which connect, in a forwardly inclined position, a supporting portion of the cowl portion at which the cowl portion supports the windshield glass and a portion that is positioned further rearward and downward than the supporting portion, and which form a closed cross-section with the cowl portion.

2. The windshield glass support structure according to claim 1, wherein each of the reinforcing members is fixed to an upper portion and a lower portion of the cowl portion.

3. The windshield glass support structure according to claim 1, wherein each of the reinforcing members has a flange portion which is bent toward the rear of the vehicle body, and is fixed to the upper portion of the cowl portion at the flange portion.

4. The windshield glass support structure according to claim 1, wherein each of the reinforcing members is formed integrally with and extending from the cowl portion.

5. The windshield glass support structure according to claim 1, wherein each of the reinforcing members is formed integrally with and extending downward from the upper end of the cowl portion, and a free end of each of the reinforcing members is fixed to the lower portion of the cowl portion.

6. The windshield glass support structure according to claim 1, wherein the cowl portion has a rigidity which causes tertiary mode vibration to occur in the windshield glass in a frequency range in which primary resonance in the lateral direction of the vehicle body occurs in air inside the vehicle cabin.

* * * * *